(12) United States Patent
Laudani

(10) Patent No.: US 11,305,804 B2
(45) Date of Patent: Apr. 19, 2022

(54) BIDIRECTIONAL TROLLEY PROVIDED WITH A HANDLING SYSTEM

(71) Applicant: Pietro Laudani, Boleslawiec (PL)

(72) Inventor: Pietro Laudani, Boleslawiec (PL)

( * ) Notice: Subject to any disclaimer, the term of this patent is extended or adjusted under 35 U.S.C. 154(b) by 0 days.

(21) Appl. No.: 17/256,217

(22) PCT Filed: Jul. 2, 2018

(86) PCT No.: PCT/IT2018/000092
§ 371 (c)(1),
(2) Date: Dec. 27, 2020

(87) PCT Pub. No.: WO2020/008481
PCT Pub. Date: Jan. 9, 2020

(65) Prior Publication Data
US 2021/0114647 A1    Apr. 22, 2021

(51) Int. Cl.
*B62B 5/06*      (2006.01)
*B62B 3/00*      (2006.01)
*B62B 5/04*      (2006.01)

(52) U.S. Cl.
CPC ............... *B62B 5/06* (2013.01); *B62B 3/001* (2013.01); *B62B 5/04* (2013.01); *B62B 2301/02* (2013.01); *B62B 2301/06* (2013.01)

(58) Field of Classification Search
CPC .. B62B 5/06; B62B 3/001; B62B 5/04; B62B 2301/02; B62B 2301/06
See application file for complete search history.

(56) References Cited

U.S. PATENT DOCUMENTS

2014/0117636 A1 *   5/2014  Gilbert ................... B60B 11/02
                                                                280/62

FOREIGN PATENT DOCUMENTS

| CN | 107344561 A | * | 11/2017 | |
|---|---|---|---|---|
| DE | 202010005402 U1 | * | 8/2011 | ......... B60B 33/0068 |
| DE | 102011118947 B3 | * | 5/2013 | ........... B62B 5/0485 |
| DE | 202016106329 U1 | * | 12/2016 | ................ B62B 3/02 |
| DE | 102016013725 A1 | * | 5/2018 | ................ B60T 7/00 |
| EP | 0854077 A2 | * | 7/1998 | ............. B62B 3/001 |
| EP | 2384950 A2 | * | 11/2011 | ............. B62B 3/001 |
| EP | 2418137 A1 | * | 2/2012 | ............. B62B 3/001 |
| EP | E P-2669143 A2 | * | 12/2013 | ............. B62B 3/001 |
| EP | 2765054 A1 | * | 8/2014 | ........... B62B 5/0079 |

(Continued)

OTHER PUBLICATIONS

Translated DE-102016013725-A1 (Year: 2022).*

*Primary Examiner* — James A Shriver, II
*Assistant Examiner* — Ian Bryce Shelton
(74) *Attorney, Agent, or Firm* — R. Ruschena, Patent Agent, LLC

(57) ABSTRACT

Bidirectional trolley (1) comprising a movable drawbar (2), a push handle (3), a loading and unloading plan (5), two front wheels (4, 4') and two rear wheels (40, 40') connected to the loading and unloading plan (5). A handling system (10) comprising in turn a first toothed means (8) connected by meshing to the front wheel (4), and a second toothed means (80) connected, again by meshing, to the rear wheel (40), in which the first toothed means (8) and the second toothed means (80) are connected to each other by a connecting bar (9) which allows the joint movement of the two toothed means (8, 80) as a result of the movement of the drawbar (2) by means of the push handle (3) by the user.

5 Claims, 3 Drawing Sheets

(56) References Cited

FOREIGN PATENT DOCUMENTS

| EP | 3305623 A1 | * | 4/2018 | ............. B62B 3/001 |
| WO | WO-9919198 A1 | * | 4/1999 | ............. B62B 3/001 |
| WO | WO-2010134038 A1 | * | 11/2010 | ............. B62B 3/001 |
| WO | WO-2015036945 A1 | * | 3/2015 | ............. B62B 3/001 |
| WO | WO-2016208060 A1 | * | 12/2016 | ................ B62B 5/04 |
| WO | WO-2018050691 A | * | 3/2018 | ........... B62B 5/0485 |

* cited by examiner

BIDIRECTIONAL TROLLEY PROVIDED WITH A HANDLING SYSTEM

BACKGROUND OF THE INVENTION

1. Field of the Invention

Subject of the present invention is a bidirectional trolley provided with an innovative handling system. In particular, its handling system allows greater operation in restricted spaces, reducing the number of maneuvers to be performed by the operator. The field of application of this type of trolleys is related to industries using industrial boxes. Said boxes are transported along production channels or assembly lines by means of a train of trolleys. Since normally the trolley handling lanes are restricted, said trolleys must be able to perform a bidirectional handling.

2. Brief Description of the Prior Art

In the state of the art some examples of trolleys with steering systems are known, which, however do not seem very maneuverable, but on the contrary require skill and physical strength to be handled by the user. Moreover, trolleys of the known type are able to move only along two directions of travel, and for this reason the steering is difficult and it is not possible to perform the trolley movement transversely with respect to the direction of travel.

In addition to this, trolleys of the known type and provided with conventional transmission system, for example with transmission bar are able to perform a steering operation with a maximum angle of 30°-40° starting from the stop position and therefore require a considerable space for handling. For example, in order to allow a correct positioning in the production lines, about fifteen maneuvers must be done by the operator with a consequent waste of time and inconvenience in work areas with limited and binding spaces.

There is therefore a need to define a trolley provided with real capacity of bidirectional movement, so as to reduce the number of needed maneuvers and being provided with a handling system which is easy to use by the operator, is simple and does not require excessive encumbrance.

SUMMARY OF THE INVENTION

Purpose of the present invention is a bidirectional trolley characterized by an innovative handling system.

The subject of the present invention solves the technical problem of the difficult maneuverability of trolley in the work areas, being easily controllable and therefore reducing the number of maneuvers during the steering phase. The bidirectional trolley is able to make very tight bends by means of the innovative handling system that allows the steering of the front wheels and the counter-steering of the rear ones, by reducing the bending radius according to the correct steering mechanism.

These and other purposes and advantages are achieved, according to the invention, by a bidirectional trolley provided with an innovative handling system, with the characteristics set forth in the annexed independent claim. Further preferred and/or particularly advantageous embodiments of the invention are described according to the characteristics set forth in the attached dependent claims.

BRIEF DESCRIPTION OF DRAWINGS

The invention will now be described with reference to the accompanying drawings, which illustrate an example of a non-limiting embodiment, in which.

DETAILED DESCRIPTION OF THE INVENTION OR OF THE PREFERRED EMBODIMENTS

Figure 1:
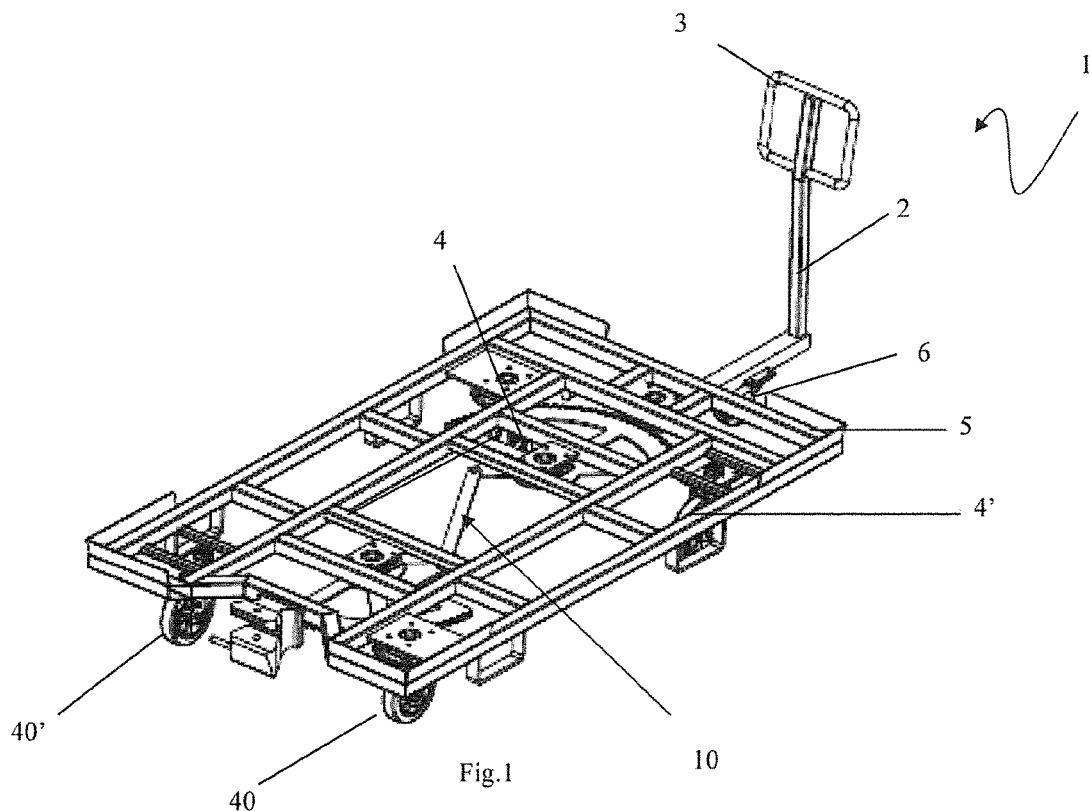
FIG. 1 is an axonometric assembly view of the bidirectional trolley according to an embodiment of the present invention.

With reference to the above figures the subject of the present invention is a bidirectional trolley 1 comprising a movable drawbar 2, a push handle 3, a loading and unloading plan 5, four wheels 4, 40, 4', 40' linked to the plan 5, two front wheels 4, 4' and two rear wheels 40, 40', a pivoting wheel 6 connected to the drawbar 2 which ensures stability to the drawbar 2 itself and a handling system 10 of the wheels 4. Throughout the present description, for the front side of the trolley the distal side is meant with respect to the push handle 3, whereas the rear side is the one proximal to the push handle 3. On the other hand, the left side and the right side of the trolley are respectively corresponding to the limbs of an operator staying rearward of the carriage itself and holding the handle 3.

In particular, the wheels 4', 40' are free to move or pivot, whereas the two wheels 4, 40 are operated and controlled by the handling system 10. The two wheels 4' and 40', placed along a diagonal of the trolley, are not controlled conversely with respect to the other two wheels 4, 40, placed on the other diagonal since the two sides of the trolley (left and right side) have necessarily mutually different bending radiuses and therefore the uncontrolled wheels will be free to adapt to the respective bending radius imposed by the specific maneuver.

Figure 2:
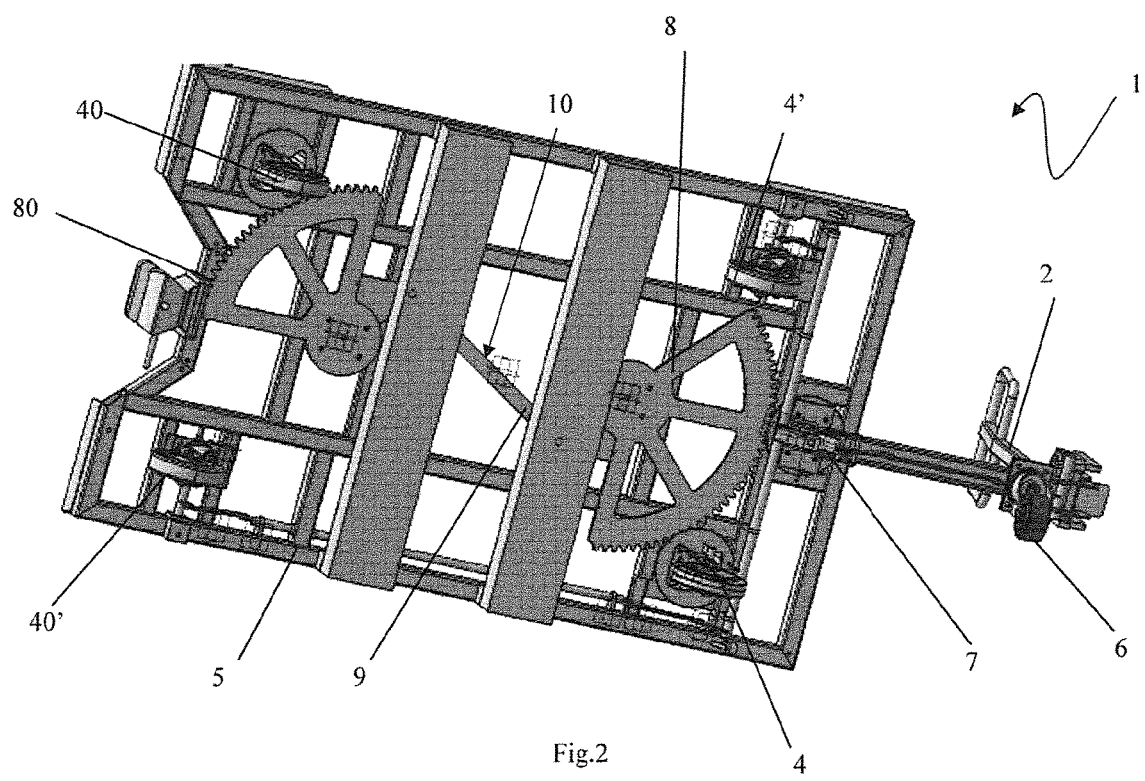
FIG. 2 is a plan view from below of the bidirectional trolley of FIG. 1.
Figure 3:
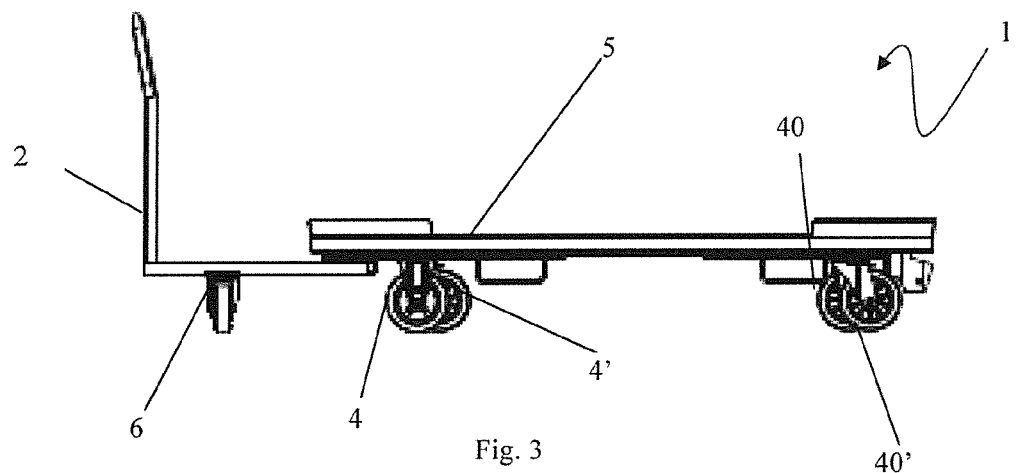
FIG. 3 is a side view of the bidirectional trolley of FIG. 1.
Figure 4:
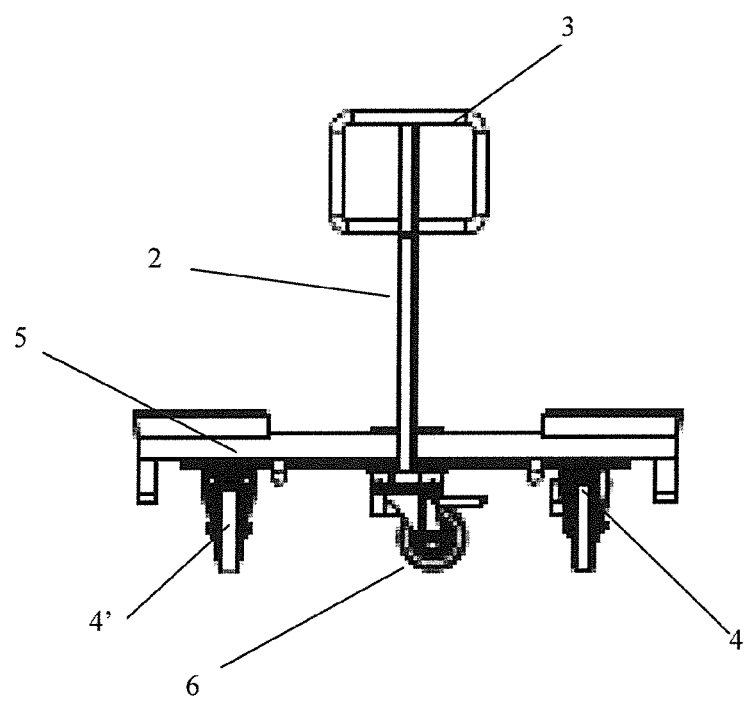
FIG. 4 shows a front rear view of the bidirectional trolley highlighting the detail of the rudder.

As can be seen in FIG. 2, the handling system 10 comprises a first toothed means 8 meshing to the front wheel 4, and a second toothed means 80, always meshing to the rear wheel 40.

The first toothed means 8 and the second toothed means 80 are connected to each other by a connecting bar 9 which allows the joint movement of the two toothed means 8, 80, as a result of the movement of the drawbar 2 by the user acting on handle 3.

Figure 5:
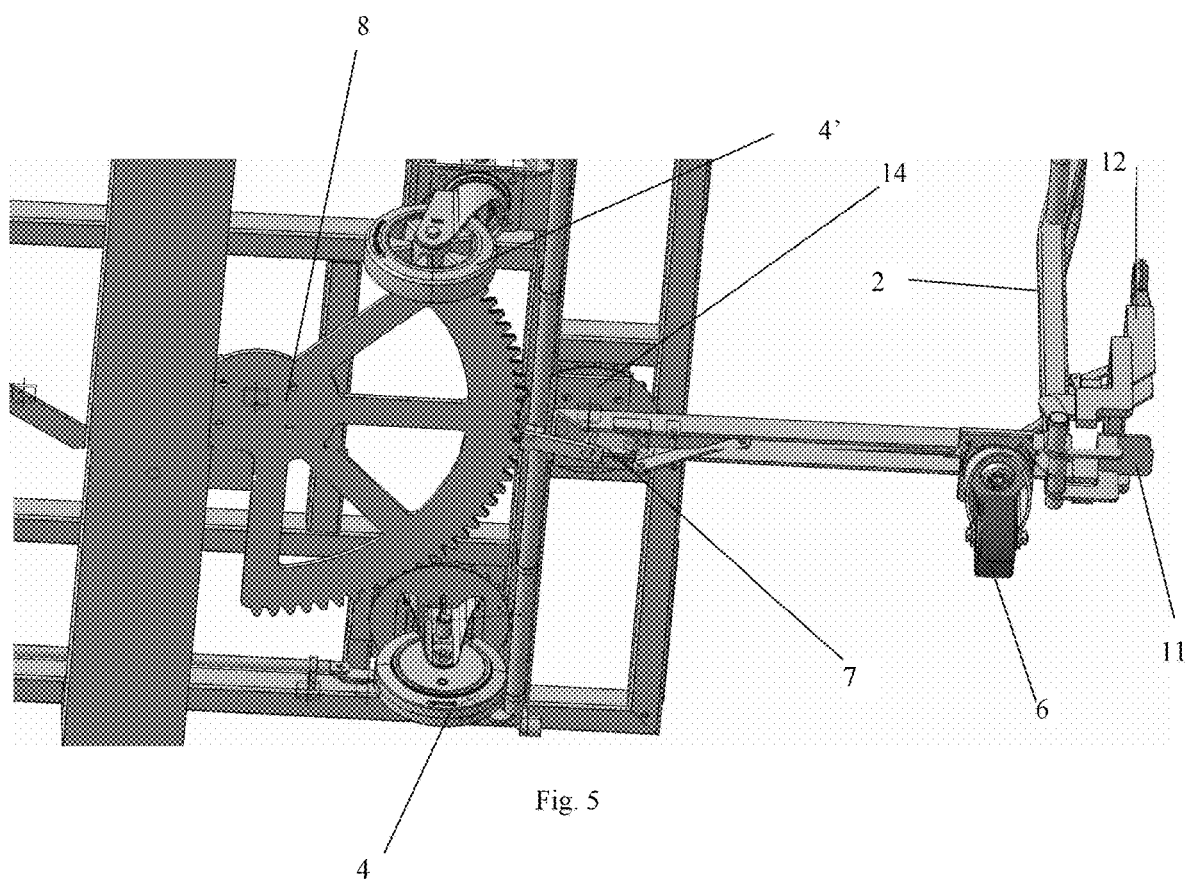
FIG. 5 is a detail of an axonometric view from below of the bidirectional trolley of FIG. 1, with respect to a detail of the bidirectional trolley handling system and of the brake applied to it.

As shown in FIG. 2 and in FIG. 5, the drawbar 2 comprises a brake 7 for the blockage of the first toothed mean 8, and consequently also of the second toothed means 80. The brake 7 can be actuated and disengaged by the operator by means of a pedal 11, visible in FIG. 5, positioned in the lower portion of the drawbar 2. The brake 7 once actuated is also operating on the brakes acting on the wheels of the trolley.

Advantageously on the drawbar 2 a folding metal ring 12 is present (FIG. 5) that once released takes the working position and disengages the brake 7.

The push handle 3 fixed to the drawbar 2 allows the handling and the pushing of trolley 1 in the desired direction.

The drawbar 2 can take different positions around the trolley 1 and is able to perform an arc of 180°, starting from one of the two side positions of the trolley 1, namely from the left side of the trolley to the right one. The possibility to position the drawbar 2 laterally to the trolley and to move it transversely due to the handling system 10, ensures an easy movement of the trolley 1. In particular, by acting on the push handle 3 in order to move the drawbar 2, the trolley 1 can be easily directed: the rotation movement of the drawbar 2 is transmitted by a third toothed means 14, integral with the rotation with the drawbar 2 itself, to the first toothed means 8 of the handling system 10. The rotational movement is then transmitted through the bar 9 also to the second toothed means 80. Ultimately, through the handling system 10, the rotation of the drawbar is transferred to the front wheels 4, 4' which are steered and to the rear wheels 40, 40' which are counter-steered, so reducing the bending radius according to the mechanism of the corrected bend.

Advantageously, the wheels 4, 4', 40, 40' can rotate by 90° so as to allow a lateral translation of the trolley 1. The transmission ratio is obtained by means of the toothed means 8, 80. The transmission ratio transforms the angle of 90° in a lower angle, for example of, and in any case in an angle permitted with the rotation of the handling bar 9 and thus with the transmission to the rear wheels 40, 40' through the bar 9 itself.

As the bar 9 does not transmit exactly the same angle of rotation, the transmission ratio to the rear wheels slightly differs from the transmission ratio to the front wheels.

Therefore, only one operation is sufficient during the transfer and positioning of the trolley in work areas with limited space or constraints. The trolley is steered without moving the same.

Although at least one exemplary embodiment has been presented in the summary and in the detailed description, it must be understood that there exists a large number of variants falling within the scope of protection of the invention. Furthermore, it must be understood that the embodiment or the embodiments presented are only examples that do not intend to limit in any way the scope of protection of the invention or its application or configurations. Rather, the brief description and the detailed description provide the skilled man with a convenient guide for implementing at least one exemplary embodiment, as it is clear that numerous variations can be made in the function and assembly of the elements described therein, without departing from the scope of protection of the invention as established by the attached claims and their technical-legal equivalents.

The invention claimed is:

1. A Bidirectional trolley (1) comprising a movable drawbar (2), a pushhandle (3), a loading and unloading plan (5), two front wheels (4, 4') and two rear wheels (40, 40') connected to the loading and unloading plan (5), a handling system (10) comprising in turn a first toothed means (8) connected by meshing to a second front wheel (4), and a second toothed means (80) connected, again by meshing, to a second rear wheel (40), in which the first toothed means (8) and the second toothed means (80) are connected to each other by a connecting bar (9) which allows the joint movement of the two toothed means (8, 80) as a result of the movement of the drawbar (2) by means of the push handle (3) by the user, said bidirectional trolley (1) comprises said drawbar (2) which in turn comprises a folding metal ring (12) which, once released, enters the working position and disengages a brake (7);

and wherein said drawbar (2) further comprises the brake (7) for locking the first toothed means (8), and consequently also the second toothed means (80).

2. The trolley according to claim 1, wherein a first two wheels (4', 40') are positioned along a first diagonal of the trolley (1) and are free to move and the second two wheels (4, 40) are placed on a second diagonal of the trolley (1) and are operated and controlled by the handling system (10).

3. The trolley according to claim 1, wherein said wheels (4, 4', 40, 40') can be rotated by an angle of 90 degrees.

4. The trolley according to claim 1, wherein said drawbar (2) further comprises a pivoting wheel (6) connected thereto to ensure stability to the drawbar (2) itself.

5. The trolley according to claim 1, wherein said drawbar (2) is configured to assume different positions around the trolley (1) and to make an arc of 180 degrees starting from one of the two lateral positions of the trolley (1), that is from the left side to the right side of the trolley.

* * * * *